(12) United States Patent
Wakabayashi

(10) Patent No.: US 7,558,475 B2
(45) Date of Patent: Jul. 7, 2009

(54) IMAGE DISPLAY APPARATUS AND SORTING METHOD

(75) Inventor: Satoru Wakabayashi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 294 days.

(21) Appl. No.: 11/445,213

(22) Filed: Jun. 2, 2006

(65) Prior Publication Data

US 2006/0280497 A1 Dec. 14, 2006

(30) Foreign Application Priority Data

Jun. 9, 2005 (JP) ............................. 2005-169765

(51) Int. Cl.
*G03B 17/18* (2006.01)
(52) U.S. Cl. ...................... 396/287; 396/236; 396/301; 396/302; 348/231.2; 348/231.3; 348/231.5
(58) Field of Classification Search ................ 396/287, 396/301, 302, 236; 348/231.99, 231.2, 231.3, 348/231.5
See application file for complete search history.

(56) References Cited

U.S. PATENT DOCUMENTS

| | | | | |
|---|---|---|---|---|
| 5,633,678 | A * | 5/1997 | Parulski et al. | 348/231.5 |
| 5,915,120 | A * | 6/1999 | Wada et al. | 713/310 |
| 6,538,698 | B1 * | 3/2003 | Anderson | 348/333.05 |
| 6,795,094 | B1 * | 9/2004 | Watanabe et al. | 715/762 |
| 7,453,355 | B2 * | 11/2008 | Bergstrom et al. | 340/539.13 |
| 2005/0088538 | A1 * | 4/2005 | Nozaki et al. | 348/229.1 |
| 2007/0242945 | A1 * | 10/2007 | Fredlund et al. | 396/310 |

FOREIGN PATENT DOCUMENTS

JP 2004-258957 A 9/2004

* cited by examiner

*Primary Examiner*—Melissa J Koval
*Assistant Examiner*—Linda B Smith
(74) *Attorney, Agent, or Firm*—Birch, Stewart, Kolasch & Birch, LLP

(57) ABSTRACT

An image display apparatus comprising:
a first storage device which stores an image file including an image and the photographing date and time information of the image;
an operation device which performs a predetermined operation;
a timing determination device which makes a determination whether or not it is the timing at which no operation occurs on the operation device;
a photographing date and time information acquisition device which acquires the photographing date and time information from the image file stored in the first storage device when a determination is made that it is the timing at which no operation occurs on the operation device;
a second storage device which stores the photographing date and time information acquired by the photographing date and time information acquisition device associated with the image file;
a display device which displays the image within the image file; and
a display control device which controls the display on the display device by sorting the images within the image file stored in the first storage device based on the photographing date and time information stored in the second storage device.

4 Claims, 9 Drawing Sheets

FIG.6

| NUMBER | FILE NAME | PHOTOGRAPHING DATE AND TIME INFORMATION |
|---|---|---|
| 1 | DSCF0001.jpg | 2005.03.16 |
| 2 | DSCF0002.jpg | 2005.03.17 |
| 3 | DSCF0003.jpg | 2005.03.18 |
| ⋮ | ⋮ | ⋮ |

IMAGE DISPLAY APPARATUS AND SORTING METHOD

BACKGROUND OF THE INVENTION

1. Field of the Invention

The present invention relates to an image display apparatus and a sorting method, and particularly to an image display apparatus having a date sorting display function and a sorting method for making the date sorting.

2. Description of the Related Art

Electronic cameras having an LCD (Liquid Crystal Display) for displaying an image obtained by photographing a subject are widely used.

Also, an image player in which images obtained by photographing subjects using an electronic camera are stored in a storage device of large capacity, and a desired image is later displayed has been provided.

By the way, an image file of Exif (Exchangeable image file) format has widely spread. Thereby, the image file can be easily exchanged between the devices of different types (e.g., between electronic camera and personal computer, between electronic camera and printer, or between electronic camera and image player). In the image file of Exif format, the photographing date and time information is contained in the additional information called a tag added to the image.

To facilitate an operation of retrieving and reading a desired file from a number of stored files, a list of file names is displayed by sorting the files in the order of date, as described in Japanese Patent Application Laid-Open No. 2004-258957 (particularly FIG. 10).

SUMMARY OF THE INVENTION

An electronic camera having a function of displaying a plurality of images by sorting them in the order of date (date sorting display function) is demanded. For example, the date sorting display is made based on the photographing date and time information included in a tag within the image file of Exif format.

However, to make the date sorting display based on the photographing date and time information included in a tag within the image file of Exif format, it is required to analyze the tag of image file for each of all the image files. As the number of image files is greater, it takes a longer time to acquire the photographing date and time information. Consequently, the user is kept waiting for a long time from the start of analyzing the tag of each image file by the operation of the user till the time of displaying the images sorted in the order of photographing date and time.

This invention has been achieved in the light of the above circumstances, and it is an object of the invention to provide an image display apparatus and a sorting method in which the date sorting can be made without keeping the user waiting.

In order to accomplish the above object, according to a first aspect of the invention, there is provided an image display apparatus comprising a first storage device which stores an image file including an image and the photographing date and time information of the image, an operation device which performs a predetermined operation, a timing determination device which makes a determination whether or not it is the timing at which no operation occurs on the operation device, a photographing date and time information acquisition device which acquires the photographing date and time information from the image file stored in the first storage device when a determination is made that it is the timing at which no operation occurs on the operation device, a second storage device which stores the photographing date and time information acquired by the photographing date and time information acquisition device associated with the image file, a display device which displays the image within the image file, and a display control device which controls the display on the display device by sorting the images within the image file stored in the first storage device based on the photographing date and time information stored in the second storage device.

With this invention, the photographing date and time information is acquired beforehand from each image file at the timing at which no operation of the user occurs, and in making the date sorting display, the images are sorted based on the photographing date and time information acquired beforehand from each image file, whereby when the date sorting display is performed, the required time for tag analysis is omitted to make the date sorting display.

According to a second aspect of the invention, there is provided the image display apparatus according to the first aspect, wherein the display control device controls the display on the display device by sorting the images within the image file based on the photographing date and time information stored in the second storage device, when the photographing date and time information acquired from the image file is stored in the second storage device, or controls the display on the display device by sorting the images within the image file based on a time stamp of an FAT (File Allocation Table) corresponding to the image file, when the photographing date and time information acquired from the image file is not stored in the second storage device.

With this invention, the required time for tag analysis is omitted even at the timing at which the photographing date and time information is not yet acquired from each image file, whereby the date sorting display is performed based on the time stamp of FAT.

According to a third aspect of the invention, there is provided the image display apparatus according to the first or second aspect, wherein the image display apparatus is an electronic camera comprising an image pickup device which picks up the image of the subject.

According to a fourth aspect of the invention, there is provided a sorting method for sorting the image files including an image and the photographing date and time information of the image, comprising the steps of making a determination whether or not it is the timing at which no operation occurs on a predetermined operation device, acquiring the photographing date and time information from the image file stored in a first storage device when a determination is made that it is the timing at which no operation occurs on the operation device, storing the acquired photographing date and time information associated with the image file in a second storage device, and sorting the image files stored in the first storage device based on the photographing date and time information stored in the second storage device.

With this invention, the date sorting can be performed without keeping the user waiting.

BRIEF DESCRIPTION OF THE DRAWINGS

FIG. 6 is an explanatory view showing one example of a management table containing the photographing date and time information associated with the image file;

DETAILED DESCRIPTION OF THE PREFERRED EMBODIMENTS

The best mode for carrying out the present invention will be described below in detail with reference to the accompanying drawings.

[Overall Configuration]

Figure 1:
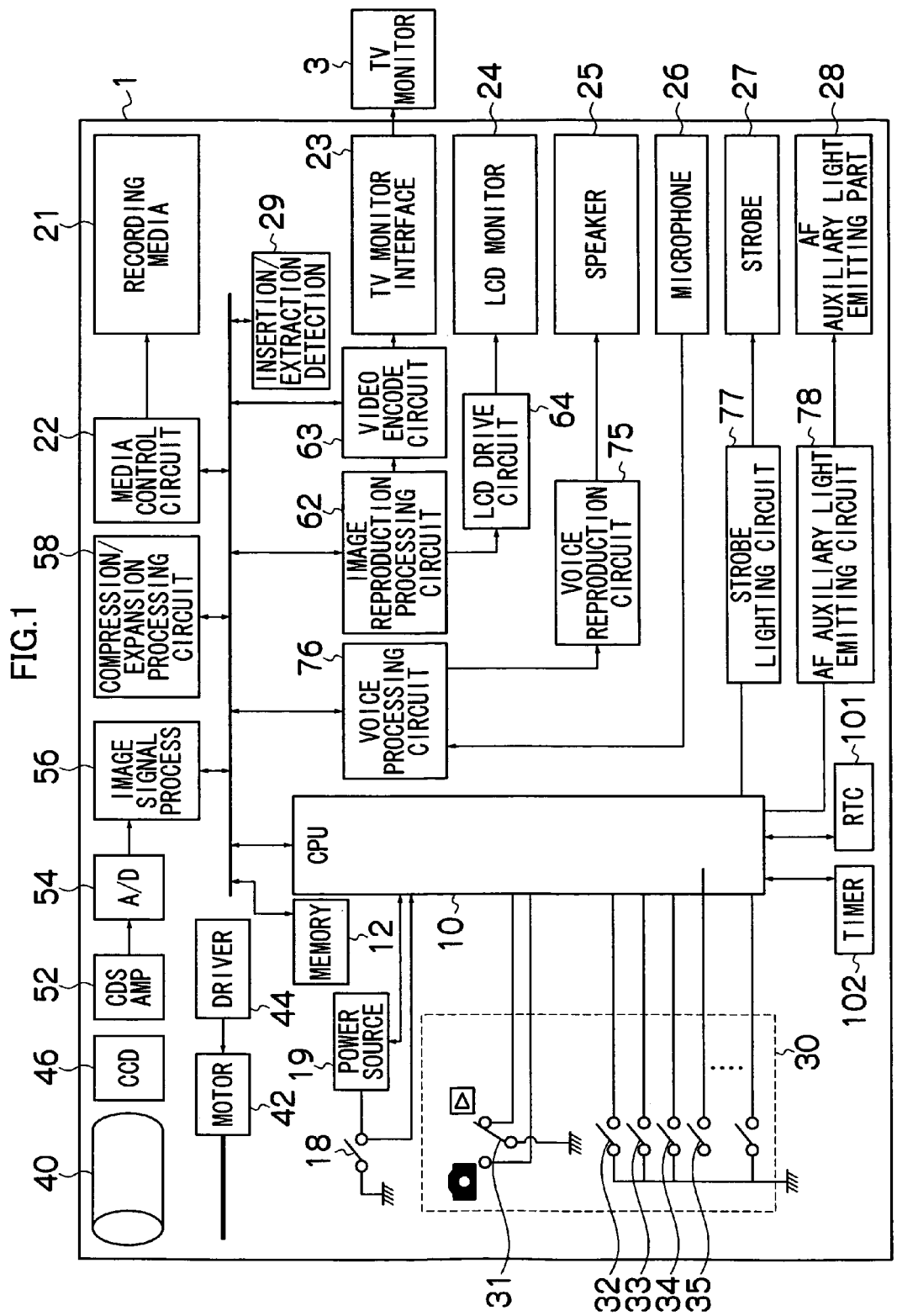
FIG. 1 is a block diagram showing the overall configuration of an electronic camera as one example of an image display apparatus according to the present invention.

FIG. 1 is a block diagram showing the overall configuration of an electronic camera 1 as one embodiment of an image display apparatus according to the invention.

In FIG. 1, a central processing unit (CPU) 10 generally controls the entire operation of the electronic camera 1 in accordance with a predetermined program.

An RTC (Real Time Clock) 101 clocks the current date and time.

A timer 102 measures a predetermined time interval in accordance with an instruction of the CPU 10. Particularly in this embodiment, the timer measures the time interval for which an operation of the user occurs.

A memory 12 comprises a RAM (Random Access Memory) having nonvolatile property with a battery backup. This memory 12 is employed as an internal image file storage device which stores an image file containing the image. Also, the memory 12 stores a management table for managing the image file. Also, the memory 12 is employed as a working area for various processes performed by the CPU 10. Also, the memory 12 comprises a program executed by the CPU 10 and a ROM (Read Only Memory) storing various kinds of fixed data required for the operation of the program.

A power button 18 is the button inputting an instruction of switching between on and off states of a power source portion 19. In this embodiment, when an operation of switching from the on state to the off state (power off) is performed by the power button 18, a signal indicating the switching operation is inputted into the CPU 10, so that the power supply from the power source portion 19 to each part of the electronic camera 1 is stopped upon an instruction of the CPU 10.

The power source portion 19 comprises a battery (chargeable battery) that can be charged from the outside of the electronic camera 1.

The recording media 21 is a memory card, for example, and can be inserted into or extracted from the electronic camera 1. This recording media 21 stores the image file containing the image.

An insertion/extraction detection sensor 29 detects whether the recording media 21 is inserted into or extracted from the electronic camera 1. This sensor may detect an inserted or extracted state of the recording media 21 mechanically or electrically.

A media control circuit 22 makes a predetermined signal conversion appropriate to the recording media 21 in writing (recording) the data into the recording media 21 or reading the data from the recording media 21.

A TV monitor interface 23 is the interface for outputting a video signal in an NTSC (National Television Standards Committee) format or a PAL (Phase Alternation by Line) format to an external TV monitor (television monitor) 3.

An LCD monitor 24 comprises an LCD (liquid crystal display) capable of color display. The LCD monitor 24 is employed as a device which reproduces and displays the image recorded in the recording media 21. This LCD monitor 24 displays the image in various modes such as date sorting display, as will be detailed later, under the control of the CPU 10, when reproducing and displaying the image.

Also, the LCD monitor 24 is employed as a display screen for user interface, and displays a menu or the information such as selection items or set contents, as needed. Also, the LCD monitor 24 is employed as an electronic finder for confirming the angle of view at the time of photographing.

A speaker 25 outputs the sound. Also, a microphone 26 inputs the sound.

A strobe 27 is a light emitting device (also called an "electronic flash") for emitting a flash by applying a voltage to a xenon gas.

An AF auxiliary light emitting portion 28 is composed of an LED (Light Emitting Diode) that emits the auxiliary light in the automatic focus.

An operation portion 30 is an operation device which inputs various kinds of instruction from the user, and composed of various buttons (often called "keys") such as a mode setting button 31, a shutter button 32, a menu/OK button 33, a cross button 34 (often called an "arrow button"), and a display button 35.

The mode setting button 31 is an operation device which inputs a setting instruction of a photographing mode for photographing the subject to record the image data in the predetermined recording media 21, a reproduction mode for reproducing the image data recorded in the recording media 21, or any other mode. The shutter button 32 is an operation device which inputs a photographing preparation instruction or a photographing start instruction. The menu/OK button 33 is an operation device which inputs a menu display instruction for displaying the menu on the screen of the LCD monitor 24 or the TV monitor 3 and a function execution instruction for performing various kinds of function. The cross button 34 is an operation device which inputs an instruction of four directions, up, down, left and right, to select an item in the menu or select the image. The display button 35 is an operation device which inputs an instruction for displaying the image on the screen of the LCD monitor 24 or the TV monitor 3 or an instruction of switching between the image display modes.

A signal from the mode setting button 31, the shutter button 32, the menu/OK button 33, the cross button 34 or the display button 35 is inputted into the CPU 10. The CPU 10 controls each part of the electronic camera 1 to perform a photographing process, an image reproduction process or an image data transmission process based on the input signal.

If the photographing mode is selected by the mode setting button 31, electric power is supplied from the power source portion 19 to the photographing part (photographing portion) comprising a CCD 46, which becomes in a photographing ready state.

A lens unit 40 is an optical unit comprising an optical lens and an iris. The lens unit 40 is electrically driven by a motor 42 and a driver 44 for driving the lens and the iris under the control of the CPU 10. Thereby, the zoom control, focus control and iris control are performed.

A light passing through the lens unit 40 is imaged on a light receiving plane of the CCD 46 (image pickup element). A number of photodiodes are arranged two-dimensionally on the light receiving plane of the CCD 46, whereby the primary color filters of red (R), green (G) and blue (B) corresponding to the photodiodes are arranged in a predetermined array structure. Also, the CCD 46 has a so-called electronic shutter function of controlling the charge storage time (shutter speed). The CPU 10 controls the charge storage time in the CCD 46. An image of the subject formed on the light receiving plane of the CCD 46 is converted into an amount of signal charge corresponding to an incident light quantity by each photodiode. The signal charge accumulated in each photodiode is sequentially read as a voltage signal (image signal for each color of R, G and B).

The image signal for each color of R, G and B taken out of the CCD 46 is sent to an analog processing part (CDS/AMP circuit) 52 for sample-and-hold (correlation double sampling process) for each pixel and amplification, and passed to an A/D converter 54 for conversion from analog to digital form. The image signal outputted from the A/D converter 54 is inputted into an image signal processing circuit 56. The image signal processing circuit 56 processes the image signal in accordance with an instruction of the CPU 10. Specifically, the image signal processing circuit 56 functions as an image signal processor comprising a coincidence circuit (circuit for correcting the image signal for a deviation caused by a spatial deviation in the array of color filters for the CCD 46), a white balance correction circuit, a gamma correction circuit, and a YC signal generation circuit, and performs a predetermined image signal processing in accordance with an instruction from the CPU 10, employing the memory 12. The image data processed by the image signal processing circuit 56 is temporarily stored in the memory 12.

The image data temporarily stored in the memory 12 is inputted via an image reproduction processing circuit 62 into an LCD drive circuit 64, which generates a drive signal of the LCD monitor 24 to be outputted as a color image from the LCD monitor 24.

If the shutter button 32 is depressed by the photographer who confirms the angle of view for photographing on the LCD monitor 24, the image signal subjected to a predetermined image processing such as white balance correction by the image signal processing circuit 56 is compressed in a predetermined format by a compression/expansion processing circuit 58, and recorded as the image data via a media control circuit 22 in the recording media 21.

If an auxiliary light is emitted from the AF auxiliary light emitting part 28 at the time of automatic focus under the control of the CPU 10, a predetermined current for AF auxiliary light emission is supplied from an AF auxiliary light emitting circuit 78 to the AF auxiliary light emitting part 28. Also, if a flash light is emitted from the strobe 27 under the control of the CPU 10 in photographing the subject, a predetermined voltage for strobe lighting is applied from a strobe lighting circuit 77 to the strobe 27.

Also, if the reproduction mode is selected by the mode setting button 31, the image data compressed and recorded in the recording media 21 is read via the media control circuit 22. The read image data is expanded by the compression/expansion processing circuit 58, and displayed via the image reproduction processing circuit 62 and the LCD drive circuit 64 on the LCD monitor 24.

If the TV monitor 3 is connected to the TV monitor interface 23, the image data read from the memory 12 is inputted via the image reproduction processing circuit 62 into a video encode circuit 63, encoded into a video signal for the TV monitor 3 by the video encode circuit 63, and outputted as a color video signal from the TV monitor interface 23.

In photographing a moving picture, an output signal (voice signal) of the microphone 26 is subjected to a predetermined voice processing by a voice processing circuit 76, and inputted as the voice data into the compression/expansion circuit 58. The voice data compressed by the compression/expansion circuit 58 is recorded together with the image data in the recording media 21.

Also, in reproducing the moving picture, the voice data recorded together with the image data in the recording media 21 is expanded by the compression/expansion circuit 58. The voice data expanded by the compression/expansion circuit 58 is inputted as a voice signal into the voice processing circuit 76, subjected to a predetermined voice processing by the voice processing circuit 76, and inputted into a voice reproduction processing circuit 75 to output the voice from the speaker 25.

[Appearance of Electronic Camera]

Figure 2:
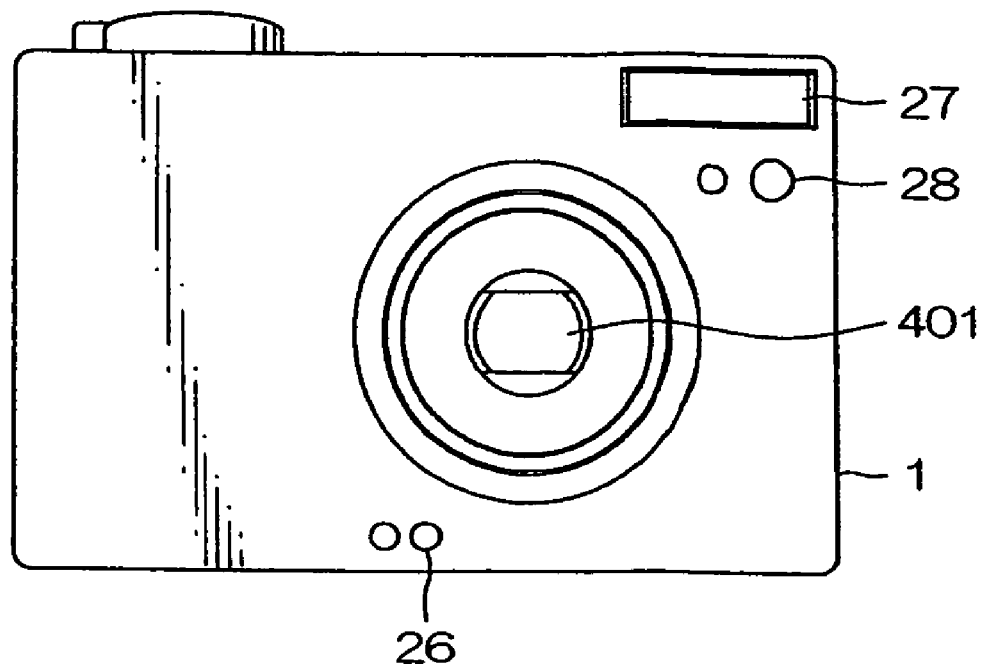
FIG. 2 is a front view showing one example of the appearance of the electronic camera.
Figure 3:
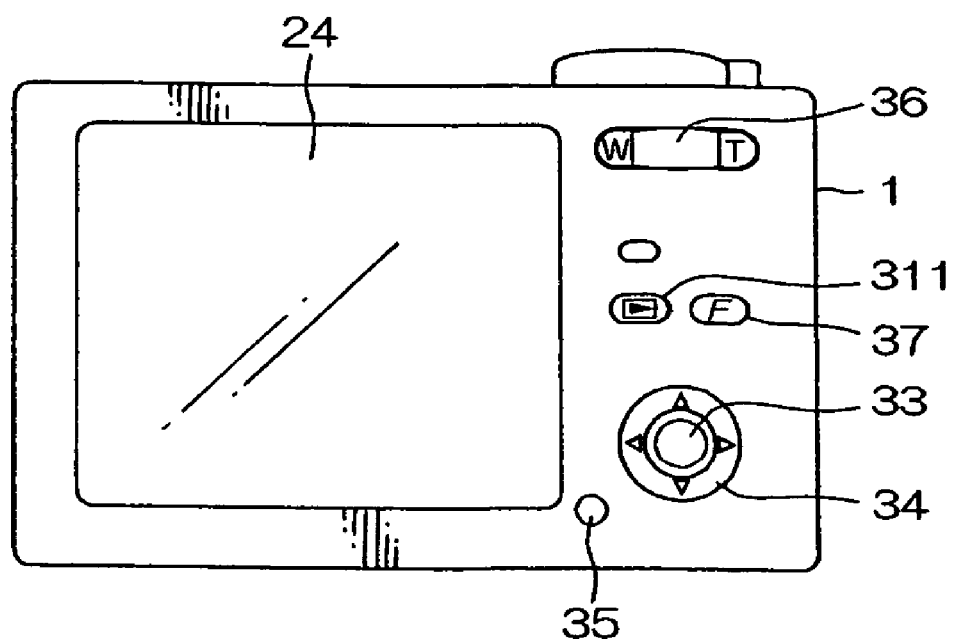
FIG. 3 is a rear view showing one example of the appearance of the electronic camera.
Figure 4:
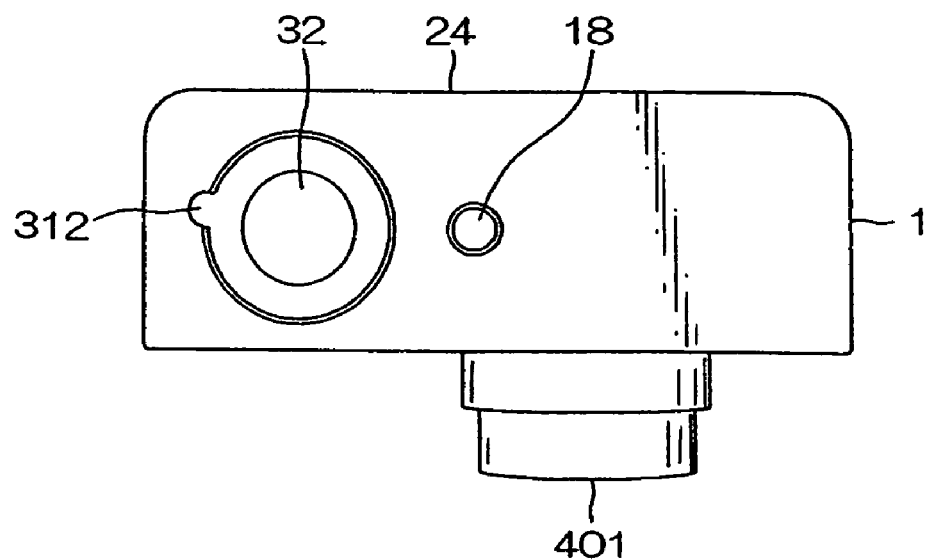
FIG. 4 is an upper view showing one example of the appearance of the electronic camera.

FIGS. 2, 3 and 4 are a front view, a rear view and an upper view showing one example of the appearance of the electronic camera 1.

An optical lens 401 that is a part of a lens unit 40, on which a reflected light from the subject is incident, is disposed on the front face (fore face) of the electronic camera 1, as shown in FIG. 2. Also, the strobe 27 is disposed on the front face of the electronic camera 1 so that a flash may be applied to the subject in photographing the subject. Also, the AF auxiliary light emitting portion 28 to apply the auxiliary light to the subject at the time of automatic focus and the microphone 26 are disposed on the front face of the electronic camera 1.

The LCD monitor 24 (liquid crystal display), a reproduction mode setting button 311 for inputting a setting instruction of the reproduction mode (constituting a part of the mode setting button 31 of FIG. 1), the menu/OK button 33, the cross button 34 (arrow button), the display button 35 for making an instruction of displaying the image or an instruction of switching between the display modes for the image, a zoom button 36 for setting the wide-angle zoom or the telephoto zoom, and a photo mode button 37 for inputting an instruction of changing the sensitivity to enjoy the photograph in a sense of properly using the film are provided on the rear face of the electronic camera 1, as shown in FIG. 3.

The power button 18, a mode lever 312 for inputting an instruction of setting the photographing mode (still image photographing mode and moving picture photographing mode), and the shutter button 32 are disposed on the upper face (head face) of the electronic camera 1, as shown in FIG. 4.

Though the bottom view is omitted, the speaker 25 is disposed on the bottom face of the electronic camera 1. Also, an insertion opening for removably mounting the recording media 21 is provided on the bottom face of the electronic camera 1. Also, an insertion opening for inserting a battery is provided on the bottom face of the electronic camera 1.

Also, though the side view is omitted, the TV monitor interface 23 is provided on one side face of the electronic camera 1.

[Configuration of Image File]

Figure 5:
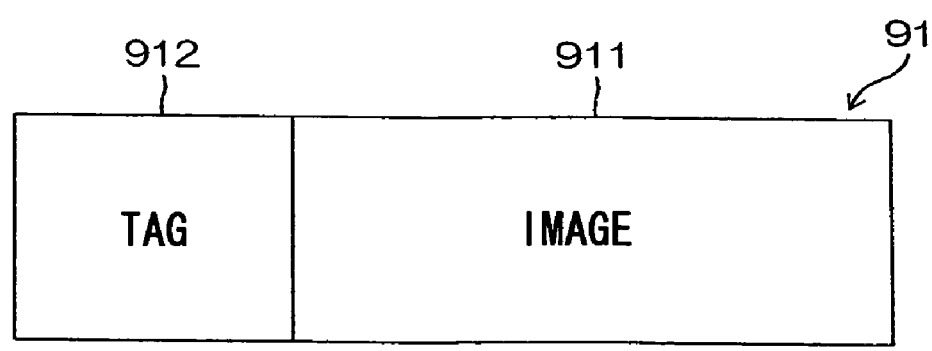
FIG. 5 is an explanatory view for explaining an image file of Exif format.

FIG. 5 shows a schematic configuration of an image file 91 of Exif format. The image file 91 as shown in FIG. 5 has an image 911 and a tag 912 appended thereto. The tag 912 includes the photographing date and time information indicating the date and time when the image 911 is photographed. Though not shown in FIG. 5, a thumbnail image as the reduced image may be included in the image file 91.

[Configuration of Management Table]

FIG. 6 shows a management table 93 stored in the memory 12 as the management information of the image file 91. The management table 93 as shown in FIG. 6 has a file name 932 and the photographing date and time information 933, for each image file, which are formed associated with each other under the control of the CPU 10.

Separately from the management table 93 as shown in FIG. 6, an FAT (File Allocation Table) is formed by a well-known file system built in the electronic camera 1. The FAT is the management information indicating where the file including the image file is stored as a list. This FAT generally includes the file name 932 and a time stamp of the file. Herein, the time stamp generally indicates the creation date and time or update date and time of the file. This FAT is formed in the storage device storing the file to be managed. Accordingly, the FAT is formed in the recording media 21 for the image file stored in the recording media 21, or the FAT is formed in the memory 12 for the image file stored in the memory 12.

[Functional Configuration of Image Display Apparatus]

Figure 7:
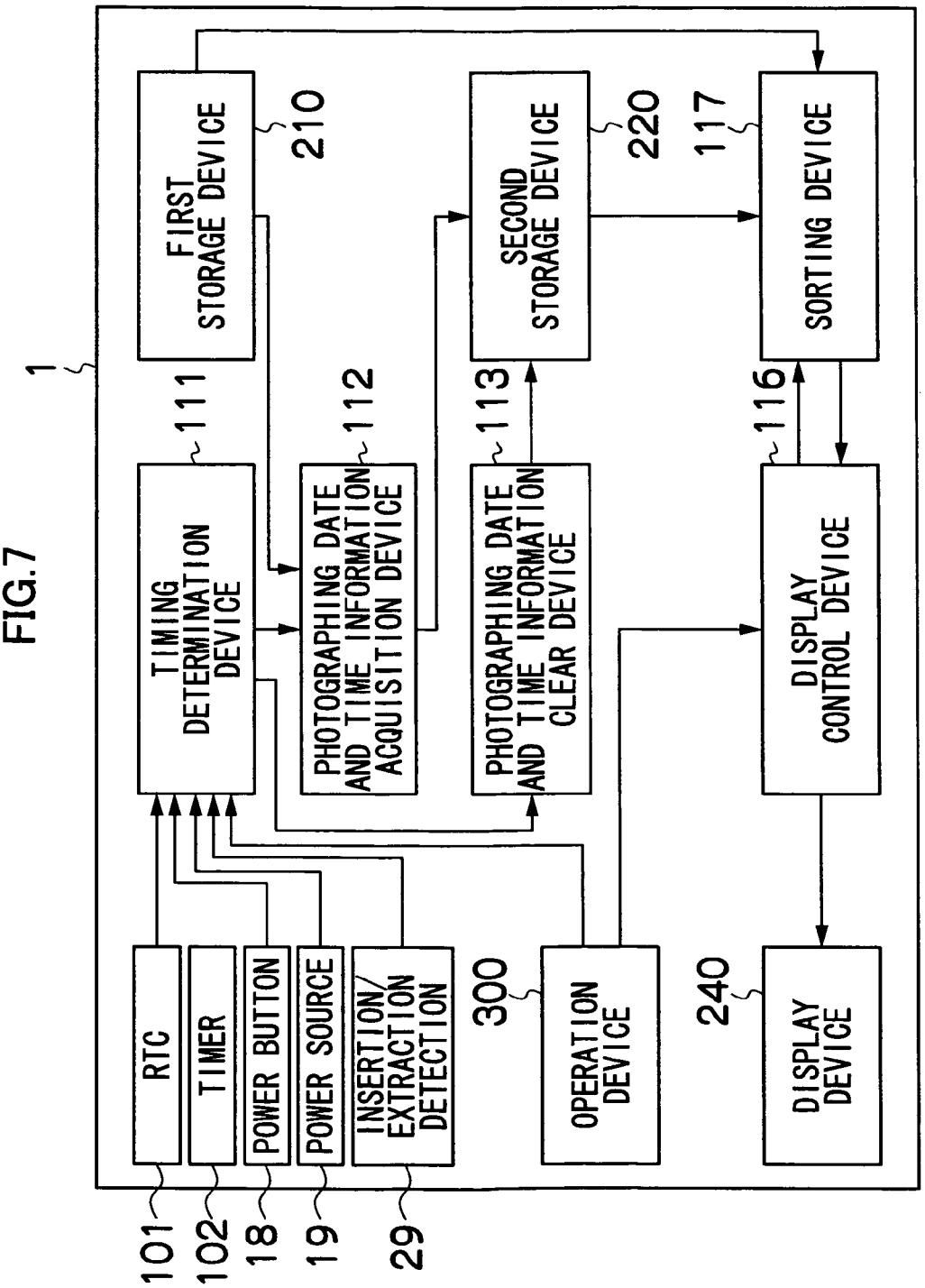
FIG. 7 is a block diagram showing the functional configuration of the essential parts of the electronic camera.

FIG. 7 is a block diagram schematically showing the functional configuration of a date sorting display relevant part of the electronic camera 1 as shown in FIG. 1 as one example of the image display apparatus.

A first storage device 210 stores the image file 91 of Exif format as shown in FIG. 5. The first storage device 210 preferably has a large capacity of storing a number of image files (e.g., 500 image files) and is non-volatile. Also, the first storage device 210 stores the FAT formed by the well-known file system, together with the image file 91.

A second storage device 220 stores the management table 93 as shown in FIG. 6. The second storage device 220 preferably has a high speed and is readable and writable. Also, it preferably is non-volatile.

An operation device 300 is operated by the user.

A timing determination device 111 determines whether or not it is the timing at which no operation of the user occurs on the operation device 300, and then determines whether or not it is the timing at which the photographing date and time information is acquired from the image file 91 stored in the first storage device 210 and stored in the second storage device 220 (cache timing).

There are various modes of determining the cache timing for the photographing date and time information in the timing determination device 111.

Firstly, when the power is turned off by the power button 18, a determination is made that no operation of the user occurs within the time required for caching the photographing date and time information (cache required time) after the power is turned off. That is, a determination is made that it is the timing for starting a cache process of the photographing date and time information.

Secondly, when the power source portion 19 starts to be charged, a determination is made that no operation of the user occurs within the cache required time after the start of charging. That is, a determination is made that it is the timing for starting the cache process of the photographing date and time information.

Thirdly, the timer 102 is instructed to measure the time interval (operation time interval) for which the operation is performed by the operation device 300, and when the operation time interval measured by the timer 102 exceeds a preset fixed time (i.e., when the timeout occurs), a determination is made that no operation of the user occurs within the cache required time after the timeout. That is, if there is no user operation for the fixed time or more, a determination is made that it is the timing for starting the cache process of the photographing date and time information.

Fourthly, a determination is made that no operation of the user occurs in the dead of night, for example, based on the current date and time measured by the RTC 101. That is, a determination is made that it is the timing for starting the cache process of the photographing date and time information.

Though all the first to fourth determination modes are performed in this embodiment, all the modes may not necessarily be performed in this invention.

A photographing date and time information acquisition device 112 acquires the photographing date and time information from a plurality of image files 91 stored in the first storage device 210 and stores it associated with the image file 91 in the second storage device 220 at the cache timing determined by the timing determination device 111. That is, the cache process for the photographing date and time information is performed.

Specifically, for all the image files 91 stored in the first storage device 210, the photographing date and time information included in the tag 912 of the image file 91 is extracted from the tag 912 of the image file 91, and the management table 93 as shown in FIG. 6 is formed in the second storage device 220. The management table 93 as shown in FIG. 6 is formed with the photographing date and time information 933 acquired from the image file 91, associated with the file name 932 of the image file 91 managed within the FAT.

A display device 240 displays the image 911 within the image file 91.

A display control device 116 controls the display device 240 to display the image 911 within the image file 91.

The display device 240 has various image display modes; firstly, one frame reproduction in which only the image of one frame is reproduced and displayed on one screen, secondly, plural frame reproduction in which the images of plural frames (e.g., nine frames) are reproduced and displayed on one screen, and thirdly, a date reproduction in which the image is reproduced and displayed for each photographing date.

Also, the display control device 116 controls the date sorting display using a sorting device 117 in the date reproduction. Specifically, when the photographing date and time information 933 acquired from the image file 91 is stored in the second storage device 220, the display control device 116 controls the display device 240 to display the images 911 within plural image files 91 by sorting them, based on the photographing date and time information 933 stored in the second storage device 220. Or when the photographing date and time information 933 acquired from the image file 91 is not stored in the second storage device 220, it controls the display device 240 to display the images 911 within plural image files 91 by sorting them, based on the time stamp of the FAT corresponding to each image file 91.

The sorting device 117 performs the date sorting in accordance with an instruction of the display control device 116. Firstly, the date sorting is performed in the order of photographing date and time information, based on the photographing date and time information 933 stored in the second storage device 220. Secondly, the date sorting is performed in the order of time stamp, based on the time stamp of the FAT.

The timing determination device 111 not only determines the cache timing of photographing date and time information, but also determines the timing (clear timing) of clearing the photographing date and time information stored in the second storage device 220. For example, when it is detected that the recording media 21 is extracted by the insertion/extraction detection sensor 29, the timing determination device 111 determines that it is the clear timing of photographing date and time information, and the photographing date and time information clear device 113 clears the photographing date and time information within the second storage device 220. For example, the management table 93 as shown in FIG. 6 is cleared from the second storage device 220. Also, when a new image is photographed, and a new image file 91 is written in the first storage device 210, a determination is made that it is the clear timing of the photographing date and time information.

The correspondence between the components of the electronic camera 1 with the functional configuration as shown in FIG. 7 and the components of the electronic camera 1 with the specific configuration as shown in FIGS. 1 to 4 will be briefly described below.

The first storage device 210 comprises the recording media 21 of FIG. 1 and the memory 12. The second storage device 220 comprises the memory 12 of FIG. 1. The operation device 300 comprises the operation portion 30 having the mode setting button 31, the shutter button 32, the menu/OK button 33, the cross button 34 and the display button 35 as shown in FIGS. 1 to 4. The timing determination device 111, the photographing date and time information acquisition device 112, the photographing date and time information clear device 113, the display control device 116 and the sorting device 117 are mainly constituted of the CPU 10 of FIG. 1. The display device 240 is mainly constituted of the LCD monitor 24 of FIG. 1.

[Process Flow]

The flow of the photographing date and time information cache process and the date sorting display process will be described below.

Figure 8:
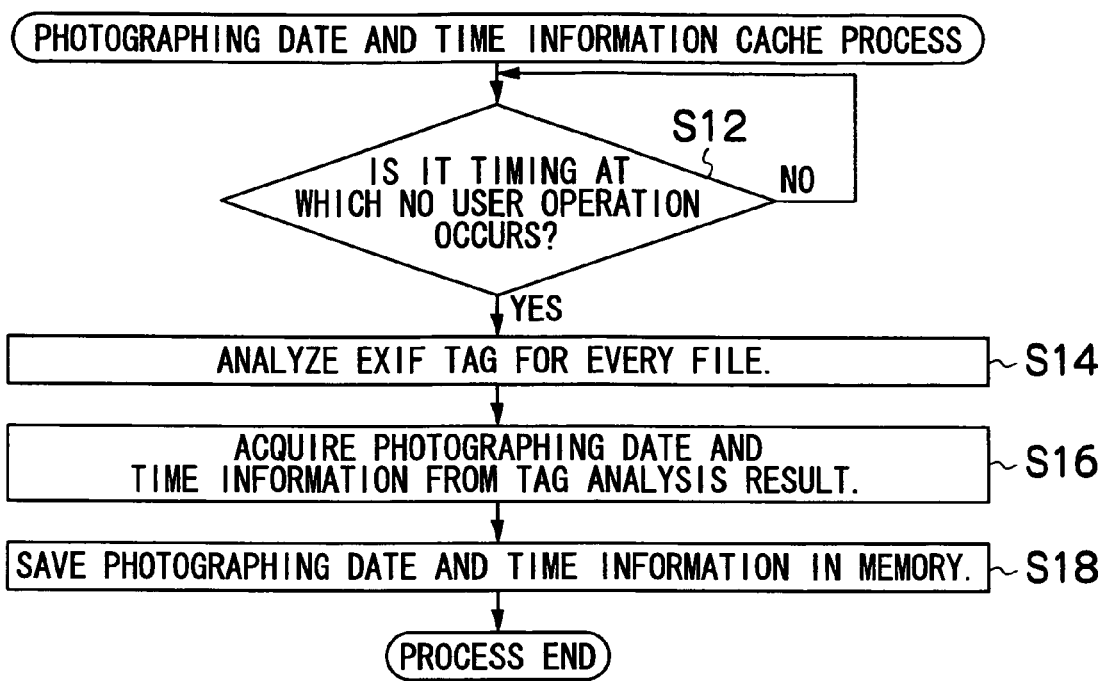
FIG. 8 is flowchart showing the flow of one example of a cache process for the photographing date and time information.

FIG. 8 is a flowchart showing the flow of one example of the photographing date and time information cache process. This photographing date and time information cache process is performed by the CPU 10 in accordance with a predetermined program.

In FIG. 8, first of all, a determination is made whether or not it is the timing at which no operation of the user occurs (S12).

If a determination is made that it is the timing at which the operation of the user occurs, the procedure waits until a determination is made that it is the timing at which no operation of the user occurs, while if a determination is made that it is the timing at which no operation of the user occurs, the tag 912 of Exif format is analyzed (S14) for all the image files 91 stored in the first storage device 210, and the photographing date and time information 933 for every image file 91 is acquired based on the analysis result of the tag 912 (S16).

And the photographing date and time information 933 acquired from the image file 91 is stored associated with each image file 91 in the second storage device 220 (S18). Specifically, the management table 93 as shown in FIG. 6 is formed on the second storage device 220.

Figure 9:
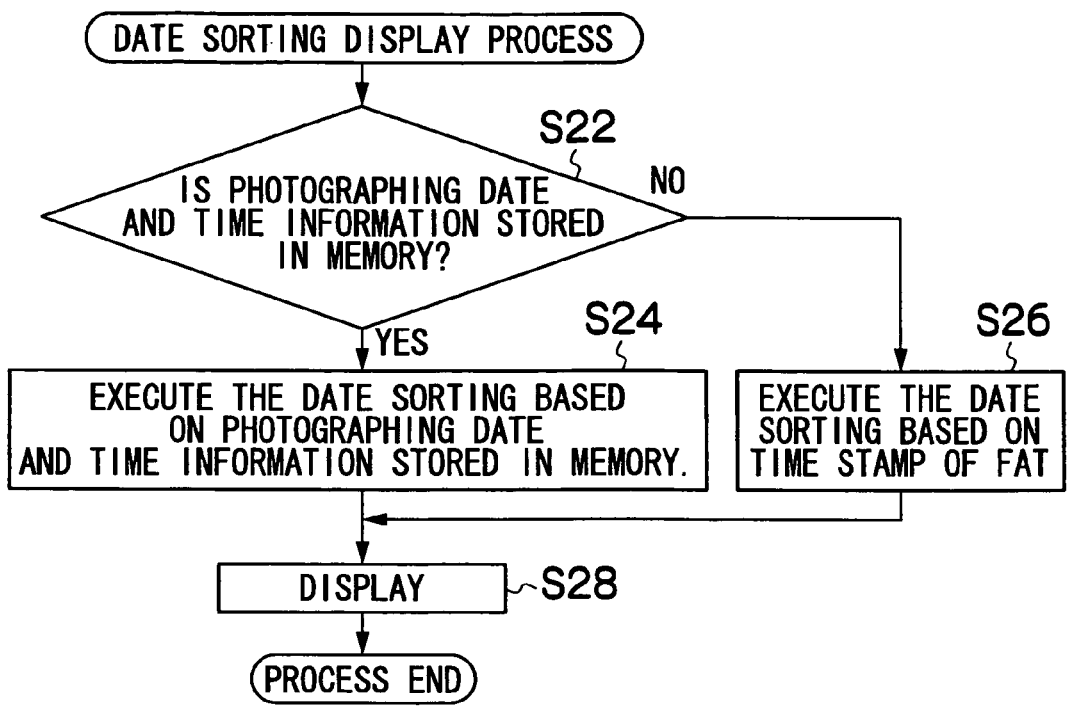
FIG. 9 is a flowchart showing the flow of one example of a date sorting display process.

FIG. 9 is a flowchart showing the flow of one example of the date sorting display process performed when the date reproduction is instructed by the display button 35. This date sorting display process is performed by the CPU 10 in accordance with a predetermined program.

In FIG. 9, first of all, a determination is made whether or not the photographing date and time information 933 is stored in the second storage device 220 (S22). Specifically, a determination is made whether or not the management table 93 as shown in FIG. 6 exists in the second storage device 220 (or whether or not the management table 93 is effective).

If the photographing date and time information is stored in the second storage device 220, the date sorting is performed based on the photographing date and time information 933 stored in the second storage device 220 (S24). On the other hand, if the photographing date and time information 933 is not stored in the second storage device 220, the date sorting is performed based on the time stamp of the FAT (File Allocation Table) (S26). And the images are sorted and displayed on the LCD monitor 24 (or the TV monitor 3) (S28).

In the example as described above, the date sorting (S24 or S26) is performed when the date reproduction is instructed by the display button 35. In this way, if the cache process for the photographing date and time information is performed beforehand at the timing at which no operation of the user occurs, the wait time of the user is negligible even if the date sorting is performed when the date reproduction is instructed by depressing the display button 35. The invention is not limited to this example, but the date sorting (S24 or S26) may be performed in advance before the display button 35 is depressed to further shorten the wait time of the user. For example, the judgement for date sorting mode (S22) and the date sorting (S24 or S26) are performed at the timing at which no operation of the user occurs, and when the date reproduction is instructed by the display button 35, the display (S28) may be only made.

A specific process for the date sorting (S24 or S26) regarding the image file is performed using the well-known sorting method. There are various well-known sorting methods. Though the image files 91 themselves may be sorted within the first storage device 210, it is unnecessary that the image files 91 themselves are sorted in this way, whereby the information for taking out the images in the order of date (date and time) momentarily is generated. For example, the contents (file name 932 and photographing date and time information 933) of the management table 93 as shown in FIG. 6 are sorted in the order of photographing date and time information in the date sorting based on the photographing date and time information 933. For example, in the date sorting based on the FAT, the information is generated by sorting the file names in the order of time stamp of the FAT.

[Example of Date Sorting Display]

A specific example of the screen (reproduction screen) on which the image is reproduced and displayed will be described below.

Figure 10:
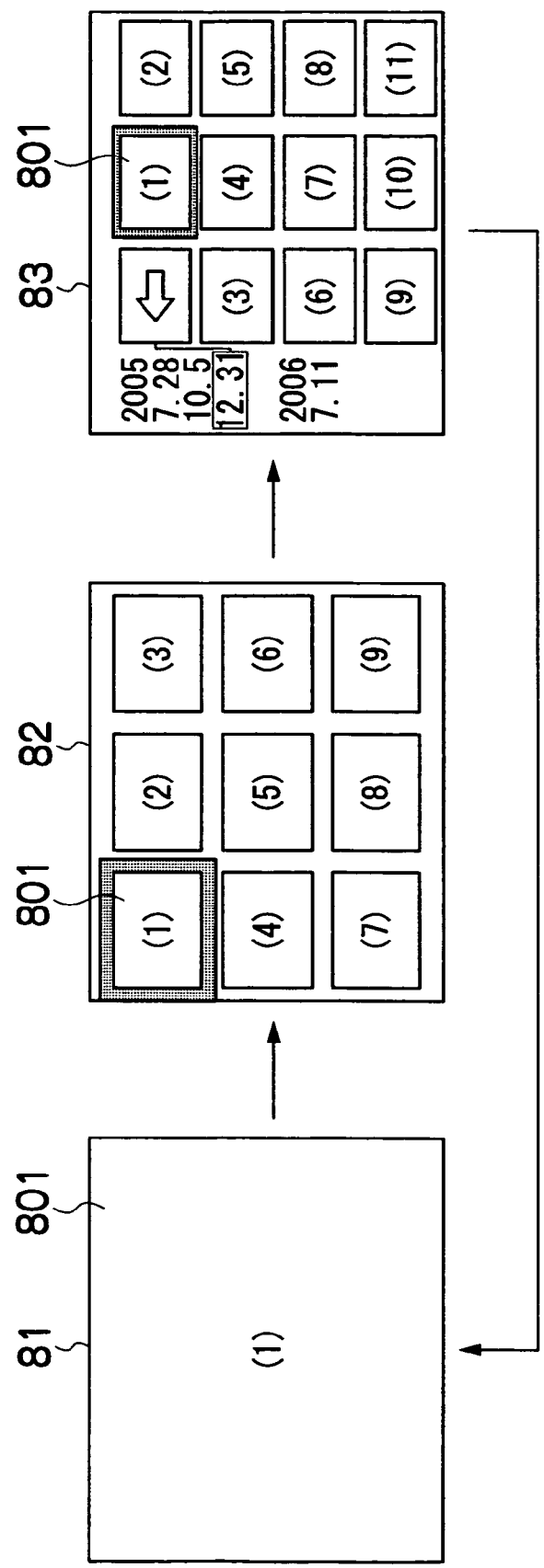
FIG. 10 is an explanatory view showing a one frame reproduction screen, a nine frame reproduction screen and a date reproduction screen which are examples of the display screen in the electronic camera.

FIG. 10 shows the examples of a one frame reproduction screen 81, a nine frame reproduction screen 82 and a date reproduction screen 83.

First of all, it is assumed that the one frame reproduction screen 81 of FIG. 10 is displayed on the LCD monitor 24 of the electronic camera 1 in accordance with an operation of the user. For example, it is assumed that when the user operates the cross button 34 after depressing the display button 35 once, an image selected by the user (selected image 801) is displayed on the LCD monitor 24. Specifically, the selected image 801 of one frame photographed on "Dec. 31, 2005" is displayed on the one frame reproduction screen 81 of FIG. 10.

If the user depresses the display button 35 again in a state where the selected screen 801 of one frame is displayed on the one frame reproduction screen 81, the one frame reproduction screen 81 is switched to the nine frame reproduction screen 82. The nine frame reproduction screen 82 of FIG. 10 displays up to nine frames of images including the selected image 801 that the user selects in advance on the one frame reproduction screen 81. The frame of the selected image 801 is highlighted on the nine frame reproduction screen 82.

If the user depresses the display button 35 again in a state where the nine frame reproduction screen 82 is displayed, the date sorting display process as explained with FIG. 9 is performed, and the nine frame reproduction screen 82 is switched to the date reproduction screen 83. The date reproduction screen 83 of FIG. 10 displays a plurality of images including the selected image 801, which are photographed on the same day as the selected image 801. The frame of the selected image 801 is highlighted on the date reproduction screen 83.

Figure 11:
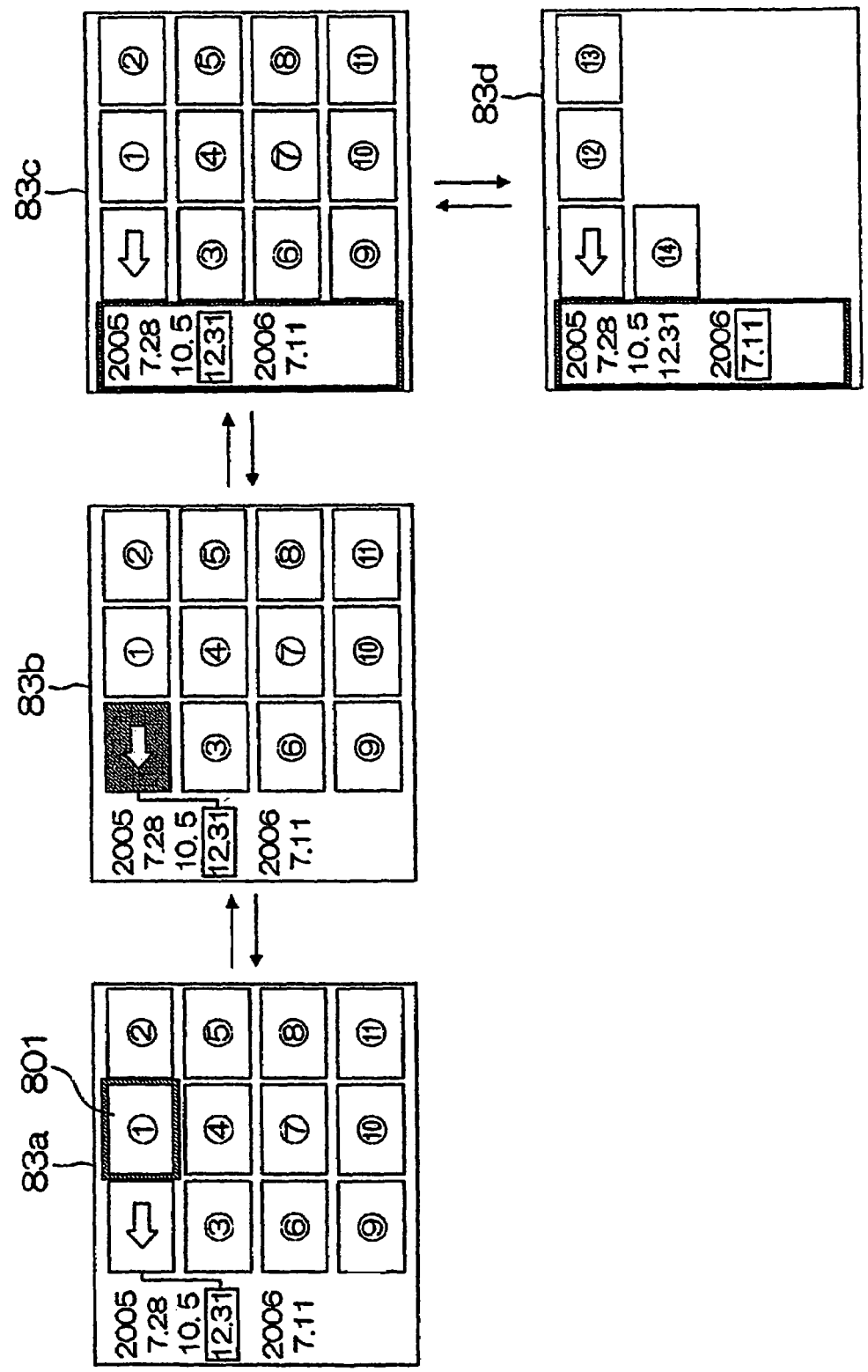
FIG. 11 is an explanatory view for explaining the date selection in the electronic camera.

FIG. 11 shows the date reproduction screens 83a, 83b, 83c and 83d useful for explaining the date selection performed on the date reproduction screen 83.

The first date reproduction screen 83a as shown in FIG. 11 is the same as the date reproduction screen 83 as shown in FIG. 10. Herein, if the user operates the cross button 34 to the left direction, the second date reproduction screen 83b on which the arrow mark is highlighted. If the user further operates the cross button 34 to the left direction, the third date reproduction screen 83c is displayed on which the frame of a list of photographing dates is highlighted. Herein, if the user operates the cross button 34 to the down direction, the date is changed, and the image is changed. In the example as shown in FIG. 11, the date reproduction screen 83c displaying plural images photographed on "Dec. 31, 2005" is switched to the date reproduction screen 83d displaying plural images photographed on "Jul. 11, 2006".

The image display apparatus according to this invention is not specifically limited to a digital still camera, but may be applied to various electronic cameras such as a digital video camera and a portable terminal with camera (e.g., portable telephone or game machine). Also, the image display apparatus according to the invention is not specifically limited to the electronic camera having an image pickup device which picks up the image of the subject, but may be the image display apparatus (e.g., an image player or an image viewer) having at least an acquisition device which acquires the image where the subject is photographed (picked up image) via the communication or the recording media, regardless of the presence or absence of the image pickup device.

Though the embodiment of the invention has been described above in detail, the invention is not limited to the examples as explained in the specification or the examples as illustrated in the drawings, but it is obvious that various design changes or improvements may be made thereto without departing from the scope or spirit of the invention.

What is claimed is:

1. An image display apparatus comprising:
   a first storage device which stores an image file including an image and the photographing date and time information of the image;
   an operation device which accepts a predetermined manual operation;
   a timing determination device which makes a determination whether or not it is the timing at which no manual operation occurs on the operation device;
   a photographing date and time information acquisition device which acquires the photographing date and time information from the image file stored in the first storage device at the timing at which no manual operation occurs on the operation device;
   a second storage device which stores the photographing date and time information acquired by the photographing date and time information acquisition device associated with the image file at the timing at which no manual operation occurs on the operation device;
   a display device which displays the image within the image file; and
   a display control device which controls the display on the display device by sorting the images within the image file stored in the first storage device based on the photographing date and time information stored in the second storage device.

2. The image display apparatus according to claim 1, wherein the display control device controls the display on the display device by sorting the images within the image file based on the photographing date and time information stored in the second storage device, when the photographing date and time information acquired from the image file is stored in the second storage device, or controls the display on the display device by sorting the images within the image file based on a time stamp of an FAT (File Allocation Table) corresponding to the image file, when the photographing date and time information acquired from the image file is not stored in the second storage device.

3. A sorting method for sorting the image files including an image and the photographing date and time information of the image, comprising the steps of:
   making a determination whether or not it is the timing at which no manual operation occurs on a predetermined operation device;
   acquiring the photographing date and time information from the image file stored in a first storage device at the timing at which no manual operation occurs on the operation device;
   storing the acquired photographing date and time information associated with the image file in a second storage device at the timing at which no manual operation occurs; and
   sorting the image files stored in the first storage device based on the photographing date and time information stored in the second storage device.

4. An electronic camera comprising the image display device of claims 1 or 2.

* * * * *